United States Patent [19]

Jacobs

[11] 4,099,769
[45] Jul. 11, 1978

[54] APPARATUS FOR ADJUSTING TENSION IN A BICYCLE SADDLE

[75] Inventor: David L. Jacobs, Boulder, Colo.

[73] Assignee: The Jacobs Corporation, Boulder, Colo.

[21] Appl. No.: 775,231

[22] Filed: Mar. 7, 1977

[51] Int. Cl.² .............................................. B62J 1/10
[52] U.S. Cl. .................................. 297/204; 297/205; 297/207
[58] Field of Search ............... 297/195, 204, 207, 205, 297/215

[56] References Cited

U.S. PATENT DOCUMENTS

| 484,289 | 10/1892 | Brooks | 297/207 |
| 597,055 | 1/1898 | Devore | 297/207 |
| 597,674 | 1/1898 | Hardy | 297/207 X |
| 607,651 | 7/1898 | Blossom | 297/204 X |
| 2,335,346 | 2/1946 | Schwinn | 297/207 |

FOREIGN PATENT DOCUMENTS 914,345  1/1963  United Kingdom ................ 297/207

Primary Examiner—James T. McCall
Assistant Examiner—Peter A. Aschenbrenner
Attorney, Agent, or Firm—John J. Byrne

[57] ABSTRACT

An apparatus for adjusting tension in an elongated bicycle saddle. The apparatus includes a frame underlying the saddle and having one end in abutting contact with a flaired trailing portion of the saddle and the other end in proximity to a narrow leading portion of the saddle. An adjustment yoke is connected to the other end of the frame and provides a bearing seat for abutting reception of an adjustment member. A thrust bearing member extends through a downwardly contoured tip portion of the saddle and carries the adjustment member such that axial tension of the saddle may be facilely adjusted through the tip of the bicycle saddle.

6 Claims, 4 Drawing Figures

APPARATUS FOR ADJUSTING TENSION IN A BICYCLE SADDLE

BACKGROUND OF THE INVENTION

This invention relates to an apparatus for adjusting tension in an elongated bicycle saddle. More specifically this invention relates to a longitudinally adjustable frame which underlies a bicycle saddle of the type including a narrow leading end portion with a downwardly contoured tip and a flaired, wider trailing end portion with a downwardly extending anchor.

At the present time many bicycle seat arrangements include a tubular frame which supports a leather or molded composition saddle. The frame is mounted upon a saddle post which in turn is vertically adjustable with respect to the structural frame of the bicycle.

For both general purpose and high performance bicycles the stiffness of the saddle can materially affect user comfort and performance. In this connection a saddle that is soft and spongy permits a substantial degree of vertical movement which promotes user abrasion and soreness. On the other hand, some degree of saddle fexibility is desirable to promote user comfort.

In at least some prior instances, saddle stiffness has been established by regulating an expandable portion of the saddle frame. The expandable portion is mounted beneath the saddle and in the event a stiffer saddle is desired, the cycle is tipped upsidedown or the saddle is removed or is tilted upwardly at the mounting post and a tension adjustment is made by increasing or decreasing the frame size.

Although such an adjustment mechanism provides a degree of flexibility for a saddle user trial and error find adjustments are tedious, time consuming and difficult to make. Moreover, under prolonged use, a saddle may tend to relax or elongate which changes the stiffness characteristics. Although field adjustment may be warranted, in such circumstances, the difficulty in making an adjustment in the field discourage many cyclists from realizing full enjoyment and comfort of the vehicle.

Additionally, in at least some previously known adjustment devices, road vibration, user movement, etc. tends to loosen the tension adjustment mechanism which promotes an unacceptable slack condition of the saddle.

The problems suggested in the preceding are not intended to be exhaustive, but rather are among many which tend to reduce the effectiveness of prior saddle assemblies. Other noteworthy problems may also exist; however, those presented above should be sufficient to demonstrate that bicycle saddle adjustment assemblies appearing in the prior art have not been altogether satisfactory.

OBJECTS OF THE INVENTION

It is, therefore, a general object of the invention to provide an apparatus for adjusting tension in a bicycle saddle which will obviate or minimize problems of the type previously described.

It is a particular object of the invention to provide an apparatus for adjusting tension in a bicycle saddle which may be readily and facilely regulated.

It is a further object of the invention to provide an apparatus for adjusting tension in a bicycle saddle wherein tension in the saddle may be adjusted without tipping the saddle or inverting the cycle.

It is yet a further object of the invention to provide an apparatus for adjusting tension in a bicycle saddle wherein axial tension is provided without twisting a saddle frame assembly.

It is another object of the invention to provide an apparatus for adjusting tension in a bicycle saddle wherein the saddle may be removed from the frame without removing the frame from the bicycle saddle post.

It is yet another object of the invention to provide an apparatus for adjusting tension in a bicycle saddle wherein a tension adjustment may be facilely locked in position.

THE DRAWINGS

Other objects and advantages of the present invention will become apparent from the following detailed description of a preferred embodiment taken in conjunction with the accompanying drawings, wherein.

DETAILED DESCRIPTION

Figure 1:
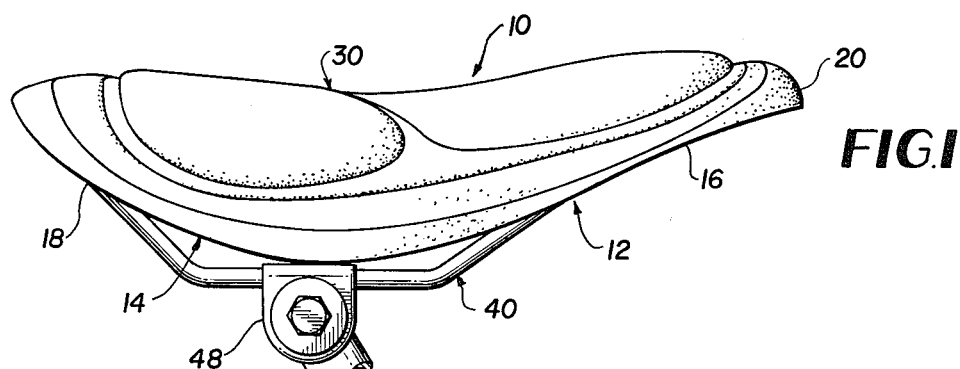
FIG. 1 is a side elevational view of a bicycle seat assembly mounted upon a bicycle frame saddle post.

Referring now particularly to FIG. 1 there will be seen a bicycle seat assembly 10 having an apparatus for adjusting tension 12 in accordance with a preferred embodiment of the invention.

Figure 2:
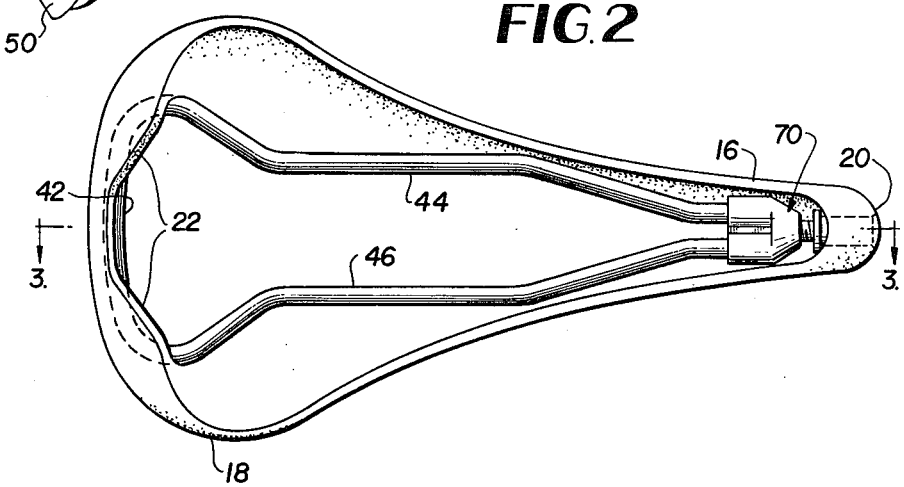
FIG. 2 is a bottom view of a bicycle saddle including an apparatus for adjusting tension in the bicycle saddle.
Figure 3:
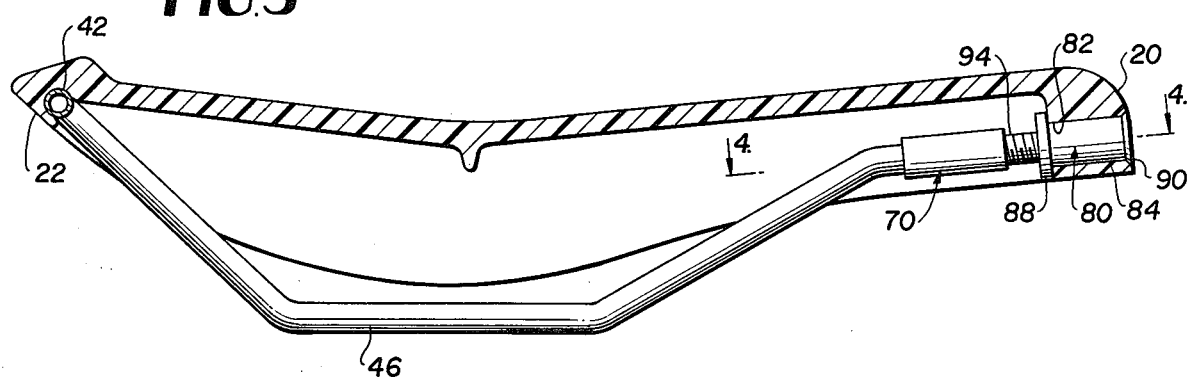
FIG. 3 is a cross-sectional view taken generally along section line 3—3 in FIG. 2.

The seat assembly 10 includes a bicycle saddle 14 having a narrow leading end portion 16, note FIG. 2, and a wider, flairing, trailing end portion 18. The narrow leading end portion 16 includes a downwardly contoured tip 20 and the wider trailing end portion 18 includes a downwardly extending anchor 22. The saddle 14 is typically fabricated from leather or a polyurethane composition having leather-like properties.

In many instances it may be desirable to connect an elongated pad 30 to the upper surface of the saddle to provide rider comfort and utility. Such an advantageous pad is disclosed and claimed in applicant's U.S. Application Ser. No. 465,385 now U.S. Pat. No. 3,997,214. The disclosure of this patent is incorporated by reference as though set forth at length.

Figure 4:
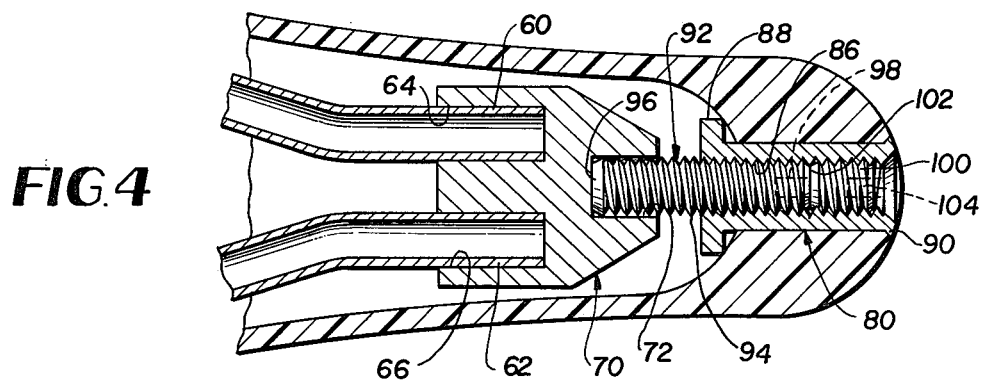
FIG. 4 is a cross-sectional view taken generally along section line 4—4 in FIG. 3 which is enlarged to show a detailed structural view of an adjustment bearing yoke, a thrust bearing, a headless adjustment bolt and a headless locking bolt all in accordance with a preferred embodiment of the invention.

The apparatus for adjusting tension 12 includes a tubular or solid generally U-shaped, contoured frame 40. The frame 40 includes a flaired portion 42 which extends in abutting engagement with the downwardly extending anchor 22 of the bicycle saddle. The frame also includes a pair of generally parallel mounting runs 44 and 46 which are designed to compatibly engage a convention locking collar 48 mounted upon a saddle post 50. The saddle post 50, in turn, is mounted for vertical adjustment upon the frame of a bicycle. The mounting runs 44 and 46 extend upwardly and converge toward the downwardly extending tip 20 of the saddle. Runs 44 and 46 terminate in generally parallel, spaced end portions 60 and 62 respectively, note FIG. 4.

The frame end portions 60 and 62 extend into and are frictionally engaged by the walls of wells 64 and 66 fashioned within one end of a generally solid adjustment yoke 70. The adjustment yoke 70 is further formed with a bearing well 72 extending into the other end of said yoke.

A thrust bearing member 80 intimately extends through an aperature 82 fashioned in the downwardly contoured saddle tip 20. Thrust member 80 includes a tubular body portion 84 having an interiorly threaded surface 86. The thrust member 80 further includes a thrust flange or collar 88 at one end thereof abutted against the interior surface of the downwardly contoured tip 20 and a retaining flange 90 at the other end thereof engaging the exterior surface of the contoured tip 20.

An adjustment member 92 extends through the thrust bearing member 80 and comprises a headless threaded bolt 94 having an axial bearing tip 96 operably extending in abutting engagement with bearing well 72 of the adjustment yoke 70. The other end of the threaded bolt 94 is formed with a recess 98 to receive a screw driver head, an allen wrench or the like so that the adjustment member 92 may be facilely rotated through the tip of the bicycle saddle.

The thrust bearing member 80 further is operable to receive a relatively short threaded locking bolt 100. The locking bolt 100 includes an abutment surface 102 at one end thereof and a recess 104 within the other end thereof to receive a screw driver head, an allen wrench or the like as previously described in connection with adjustment member 92.

In operation a cyclist desiring to either initially set or altar the axial tension in the bicycle saddle 14 may readily and easily do so merely by backing out the locking bolt 100 to expose the adjustment bolt 92. The adjustment bolt is then rotated by extending a tool through the thrust bearing member 80 and into operative engagement with recess 98.

Advancement of adjustment bolt 92 thrusts against yoke 70 which in turn transmits the force to saddle anchor 22 through the tubular or solid frame 40. This rearward thrust is reached against the thrust flange or collar 88 which is in engagement with the downwardly extending tip 20 of the bicycle saddle, as previously described. Longitudinal tension is thereby imparted to the saddle which increases its stiffness and reduces its flexure to normal forces provided by a cyclist sitting upon the bicycle seat.

Once an optimum axial tension is attained, the adjustment may be accurately maintained by turning the locking bolt 100 into secure engagement with the end of the adjustment bolt 92.

Further a cyclist may readily change a saddle without removing the saddle frame from the bicycle by completely withdrawing the adjustment bolt 92 from engagement with the adjustment yoke 70. The saddle may then be facilely titled upwardly at the leading end and pivoted away from the frame 40 about the anchor 22.

In describing an apparatus for adjusting tension in an elongated bicycle saddle in accordance with a preferred embodiment of the invention those skilled in the art will recognize several advantages which singularly distinguish the subject invention from previously known devices.

A particular advantage resides in the ability to facilely adjust tension in a bicycle saddle by adjustment through the forward end of the saddle. In this regard a cyclist is able to make fine adjustments in saddle tension while either sitting upon or positioned astride the saddle.

Moreover, axial tension may be readily varied, as use conditions warrant, without fumbling under the cycle seat or turning the cycle upsidedown.

Once a desired tension is achieved it may be accurately maintained through the application of the locking bolt 100.

During adjustment the adjustment bearing yoke serves to impart equal axial thrust to each branch of the frame 40 and thus minimizes any torsional skewing of the frame.

Further the subject adjusting apparatus facilitates saddle replacement by permitting saddle removal without removing the frame from the bicycle saddle post.

In describing the invention, reference has been made to a preferred embodiment. Those skilled in the art, however, and familiar with the disclosure of the subject invention, may recognize additions, deletions, substitutions, modifications and/or other changes which will fall within the purview of the invention as defined in the following claims.

What is claimed is:

1. An apparatus for adjusting tension in an elongated bicycle saddle wherein said saddle includes a narrow leading end portion with a downwardly contoured tip and a wider trailing end portion with a downwardly extending anchor, said apparatus comprises:

frame means underlying and connected to said bicycle saddle for operably supporting said saddle upon a bicycle saddle post, said frame means including
a first portion extending in abutting contact with the downwardly extending anchor of said bicycle saddle; and
a generally U-shaped contoured tubular member including;
a flaired portion defining said first portion extending in abutting contact with said downwardly extending anchor,
a pair of generally parallel mounting runs for connection to said bicycle saddle post, and
generally parallel, spaced, end portions extending toward said downwardly extending tip of said bicycle saddle for engagement with said adjustment bearing means;
an adjustment bearing means connected to a second remote portion of said frame means and extending in proximity to but spaced from the downwardly contoured tip of said bicycle saddle; said adjustment bearing means including
a generally solid yoke member including,
a pair of parallel wells on one end thereof to receive in frictional engagement said parallel, spaced end portions of said tubular U-shaped frame means, and
a bearing well on the other end thereof to receive in abutting contact said adjustment means;
thrust bearing means extending through said downwardly contoured tip portion of said bicycle saddle including
a tubular member having,
a threaded interior surface,
a thrust flange on one end thereof for contacting and bearing against the interior surface of said downwardly contoured tip, and
a retaining flange on the other end thereof for contacting the exterior surface of said downwardly contoured tip and retaining said thrust bearing means in position extending through said downwardly contoured tip of said bicycle saddle; and adjustment means connected to and extending through said thrust bearing means and in abutting contact with said adjustment bearing means for imparting longitudinal tension between the downwardly contoured tip and the downwardly extending anchor of said elongated bicycle saddle upon selective regulation of said adjustment means through the downwardly contoured tip of said bicycle saddle.

2. An apparatus for adjusting tension in an elongated bicycle saddle as defined in claim 1 wherein said adjustment means comprises:

a bolt operable to screw into said thrust bearing means and abut against said adjustment bearing means wherein advancing rotation of said bolt will serve to separate said adjustment bearing means from said thrust bearing means to increase longitudinal tension upon said bicycle saddle.

3. An apparatus for adjusting tension in an elongated bicycle saddle as defined in claim 2 wherein:

said adjustment bolt is headless and being axially dimensioned to be received within said tubular thrust bearing means; and a locking bolt threadedly received within said tubular thrust bearing means to abut against the head of said adjustment bolt and prevent unintended displacement of said adjustment bolt.

4. An apparatus for adjusting tension in an elongated bicycle saddle wherein said saddle includes a narrow leading end portion with a downwardly contoured tip and a wider trailing end portion with a downwardly extending anchor, said apparatus comprises:

frame means underlying and connected to said bicycle saddle for operably supporting said saddle upon a bicycle saddle post, said frame means including a first portion extending in abutting contact with the downwardly extending anchor of said bicycle saddle;

an adjustment bearing means connected to a second remote portion of said frame means and extending in proximity to but spaced from the downwardly contoured tip of said bicycle saddle;

thrust bearing means extending through said downwardly contoured tip portion of said bicycle saddle, said thrust bearing means comprising, a tubular member including,
a threaded interior surface, and
a thrust flange on one end thereof for contacting and bearing against the interior surface of the downwardly contoured tip of said bicycle saddle;

threaded adjustment means connected to and extending through said thrust bearing means and in abutting contact with said adjustment bearing means for imparting longitudinal tension between the downwardly contoured tip and the downwardly extending anchor of said elongated bicycle saddle upon selective regulation of said adjustment means through the downwardly contoured tip of said bicycle saddle; and said adjustment bearing means including a yoke connected at one end thereof to said frame means and providing at the other end thereof an abutment surface to receive engagement of said adjustment means.

5. An apparatus for adjusting tension in an elongated bicycle saddle as defined in claim 4 wherein said adjustment means comprises:

a headless bolt operable to screw into said thrust bearing means and abut against said adjustment bearing means wherein advancing rotation of said bolt will serve to separate said adjustment bearing means from said thrust bearing means to increase longitudinal tension upon said bicycle saddle.

6. An apparatus for adjusting tension in an elongated bicycle saddle as defined in claim 5 wherein said adjustment means further comprises:

a locking bolt threadedly received within said tubular thrust bearing means to abut against the head of said adjustment bolt and prevent unintended displacement of said adjustment bolt.

* * * * *